MULTILAYER LASER BODY

CONTACT LAYERS

STRIPE GEOMETRY DEFINED

PHOTORESIST ETCH $O_2$ PLASMA TREATMENT

BOMBARD PROTON IRRADIATION

ANNEAL TO REMOVE HIGH $\alpha$ ONLY

LAP SUBSTRATE & CONTACT

SCRIBE, CLEAVE MOUNT ON HEAT SINK

MULTILAYER LASER BODY

BOMBARD

BOMBARDED REGIONS OF HIGH p & HIGH $\alpha$

LIQUID HONE

ANNEAL TO REMOVE HIGH $\alpha$ ONLY

CONTACT LAYERS

LAP SUBSTRATE & CONTACT

SCRIBE, CLEAVE MOUNT ON HEAT SINK

United States Patent Office 3,824,133
Patented July 16, 1974

3,824,133
FABRICATION OF ELECTRICALLY INSULATING REGIONS IN OPTICAL DEVICES BY PROTON BOMBARDMENT
Lucian Arthur D'Asaro, Madison, John Cameron Dyment, Chatham, Matthew Kuhn, Warren, and Stuart Marshall Spitzer, Berkeley Heights, N.J., assignors to Bell Telephone Laboratories, Incorporated, Murray Hill, N.J.
Filed Dec. 2, 1971, Ser. No. 204,222
Int. Cl. H01l 7/54
U.S. Cl. 148—1.5
33 Claims

ABSTRACT OF THE DISCLOSURE

A method of fabricating electrically insulating regions of low optical absorption in optical devices, such as junction lasers and incoherent light emitting diodes, is described. The technique includes the steps of (1) irradiating the desired regions with high energy protons which advantageously produce high resistivity but disadvantageously also produce high optical absorption and (2) subsequently annealing these regions for a time and at a temperature effective to reduce substantially the proton-induced optical absorption while retaining the proton-induced resistivity at a level sufficient for electrical insulation. Detailed parameters for irradiating and annealing are given for GaAs and GaP. Specifically described are applications of this technique in the passivation of p-n junctions and in the fabrication of stripe geometry junction lasers.

BACKGROUND OF THE INVENTION

This invention relates to the fabrication of electrically insulating regions of low optical absorption in optical devices and more particularly to the fabrication of such regions in junction lasers and incoherent light emitting diodes (LEDs).

In numerous semiconductor devices it is necessary that electrical contacts be contiguous with only prescribed regions of the device and be electrically insulated from other regions. Moreover, in semiconductor devices which employ a p-n junction, reliability can be improved by passivating the junction, for example, to prevent surface contamination of the exposed edges of the junction or to suppress surface leakage current.

Typical prior art techniques have employed deposited oxide layers to provide both the necessary electrical insulation and to passivate the junction. This approach has been applied to the fabrication of numerous optical devices such as beam-leaded electroluminescent diodes, as described by Lynch et al. in *IEEE Transactions on Electron Devices*, Ed–14, 705 (October 1967), and stripe-geometry junction lasers, as described by J. C. Dyment in *Applied Physics Letters, 10*, 84 (1967). It has been found, however, that metallic layers used for contacting purposes adhere poorly to these oxide layers. Consequently the reliability of both the beam-lead bond in LEDs and the stripe contact bond is lasers is reduced. Moreover, since the oxide layer in the latter device adds nothing to the resistivity of the underlying semiconductor, current flowing through the stripe contact tends to spread into these underlying regions with consequent increase in the current threshold for lasing.

One alternative to the oxide layer approach to electrical insulation is suggested by the work of Foyt et al. who demonstrated that proton bombardment produced high resistivity in both n- and p-type GaAs (see, *Solid State Electronics, 12*, 209 (1969)). While Foyt et al. applied this technique in the fabrication of cetrain non-optical GaAs devices, including the formation of isolation regions between p-n junction diodes and the formation of guard rings for Schottky barrier diodes, they gave no consideration to the effect of proton bombardment on the optical properties, specifically the optical absorption, of the irradiated semiconductor material.

SUMMARY OF THE INVENTION

We have discovered that proton bombardment of semiconductors such as GaAs and GaP not only advantageously produces the high resistivity required for electrical insulation, but also disadvantageously produces undesirably high optical absorption for useful irradiation dosages. The proton-induced absorption, which is added to inherent absorption of the bulk semiconductor, increases the threshold of junction lasers and decreases the efficiency of LEDs.

In accordance with one feature of our invention, we have found that an appropriate post-annealing step can reduce the aforementioned proton-induced optical absorption to nearly the bulk value, but can retain the proton-induced resistivity at levels sufficient for electrical insulation. In the fabrication of GaAs and/or AlGaAs junction lasers useful proton dosages are typically those in the range of approximately $10^{15}$ to $3 \times 10^{16}$ protons/cm.$^2$ for which an appropriate post-anneal involves heating for approximately 30 minutes to 1 minute at temperatures ranging from 300° C. to 600° C. For devices such as GaP LEDs a useful irradiation range is approximately $10^{14}$ to $10^{17}$ protons/cm.$^2$ for which an appropriate annealing involves heating for 1 hour to 5 minutes at 300° C. to 600° C.

In accordance with another feature of our invention, we have discovered that the resistivity versus proton dose characteristic of both GaAs and GaP exhibits a peak resistivity at a particular dosage. By irradiating the material at a dosage above that corresponding to the peak resistivity, we have found that appropriate annealing in fact increases, rather than decreases, the proton-induced resistivity and at the same time reduces the proton-induced absorption.

The surprising ability of a post-anneal to substantially reduce proton-induced optical absorption, while maintaining sufficient proton-induced resistivity for electrical insulation purposes, appears to be attributable to two types of defects produced in the semiconductor by the proton bombardment. One type of defect, that associated with increased absorption, appears to produce traps or energy states with relatively low activation energies near the band edges of the semiconductor material. The other type of defect, that associated with increased resistivity, appears to produce traps or energy states with relatively higher activation energies farther from the band edges. Thus, it appears that optical defects are annealed out first, because of their lower activation energies, while the resistivity defects are retained—provided, of course, that an appropriate annealing time and temperature are chosen. The foregoing theoretical explanation is presented to assist one skilled in the art to understand more fully our invention and is not intended to limit its scope.

BRIEF DESCRIPTION OF THE DRAWING

Our invention, together with its various features and advantages, can be easily understood from the following more detailed description taken in conjunction with the accompanying drawing, in which.

DETAILED DESCRIPTION

Before discussing in detail the fabrication of devices in accordance with our invention, it will be helpful to consider first the effect of proton bombardment and subsequent annealing on the electrical and optical properties of bombarded materials. Specific attention will be given to two important III–V compounds: GaAs which is especially useful in semiconductor junction lasers and infrared LEDs and GaP which is used in visible LEDs.

Gallium Arsenide

Figure 1A:
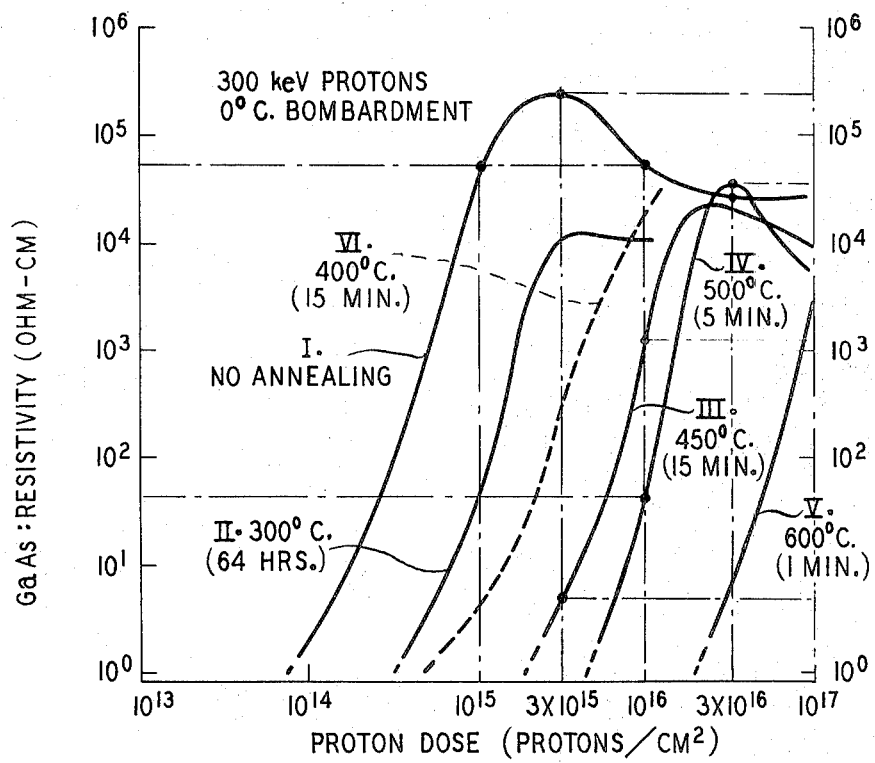
FIGS. 1A and 1B are graphs showing the effect of annealing on the resistivity and optical transmissivity, respectively, of proton-bombarded GaAs.
Figure 1B:
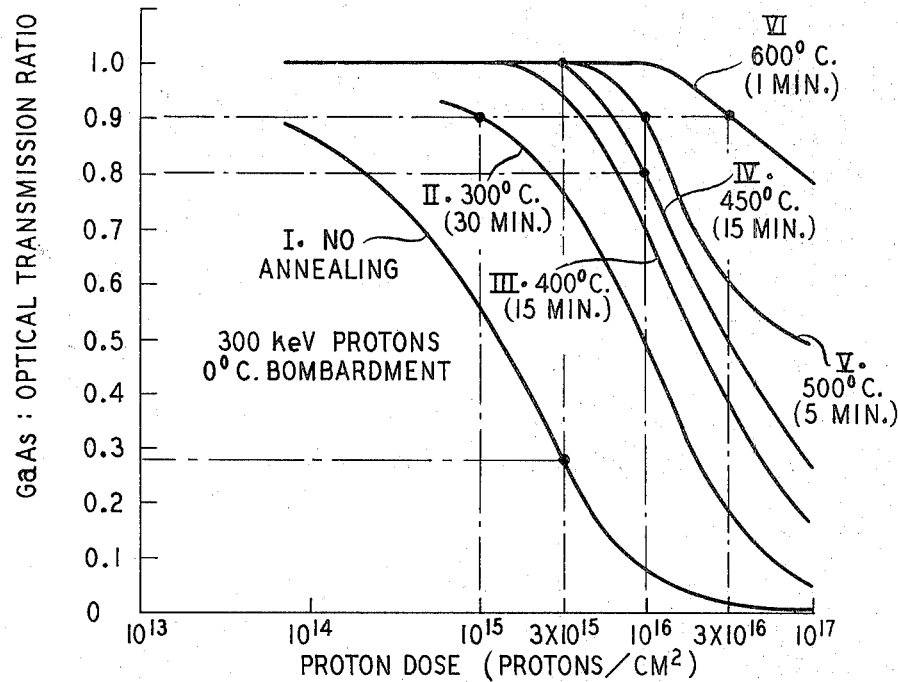

Turning now to FIGS. 1A and 1B, there are shown graphs of electrical resistivity and optical transmission ratio, respectively, as a function of proton dosage in the range $10^{14}$ to $10^{17}$ protons/cm.$^2$ for 300 kev. protons made incident on bulk p-type GaAs samples maintained at about 0° C. It is believed, moreover, that n-type GaAs exhibits quite similar properties. The bulk samples were doped with either Zn or Cd and had hole concentrations ranging from about $2\times10^{18}$ to $1.4\times10^{19}$/cm.$^3$. In this range, bulk p-type GaAs is similar to the material present in the inactive regions contiguous with the waveguide (or active region) of the most common form of a double heterostructure junction laser. For purposes of comparing the material properties before and after bombardment, a portion of each sample was shielded from the proton beam.

As shown in curve I of FIG. 1A, the resistivity of bombarded GaAs increases monotonically with proton dosage from $10^{14}$ protons/cm.$^2$ until a peak resistivity of about $2\times10^5$ ohm-cm. is reached at about $3\times10^{15}$ protons/cm.$^2$. Higher dosages produce monotonically decreasing resistivity. It should be noted here that the resistivity of the unbombarded GaAs was about $6\times10^{-3}$ ohm-cm. whereas a resistivity of about 1.0 ohm-cm. is adequate for the fabrication of stripe contact geometry junction lasers described hereinafter. In addition, while the curves of FIG. 1A are shown to reach 1.0 ohm-cm., in fact noise limitations in our measurement technique prohibited accurate measurement of resistivities below about 1.2 ohm-cm. If the scale were expanded to include the range $10^0$ to $10^{-3}$ ohm-cm., it is believed that these curves would continue to decrease toward the bulk unbombarded resistivity.

In addition to higher resistivity, proton bombardment has been found to produce increased optical absorption. Evidence of such increased absorption is given by Curve I of FIG. 1B which shows that optical transmission decreases monotonically with increasing proton dosage. In FIG. 1B the ordinate is given in terms of a ratio: the transmission through a bombarded region divided by the transmission through an unbombarded region. Illustratively, for a dosage of $3\times10^{15}$ protons/cm.$^2$ the transmission ratio decreases from 1.0 to about 0.28 which corresponds to an increase in absorption coefficient from about 54 cm.$^{-1}$ to about 5000 cm.$^{-1}$. Such high proton-induced absorption would be undesirable in optical devices due to increased optical losses.

We have discovered, however, that appropriate annealing subsequent to bombardment effectively reduces the proton-induced optical absorption to nearly the bulk value (about 54 cm.$^{-1}$ at 9360 A.) while retaining the proton-induced resistivity at levels sufficient for electrical insulation (i.e., about 1 ohm-cm.). More specifically, in FIG. 1A curves II–V show how the resistivity decreases for progressively higher temperature and shorter time anneals. Curve VI of FIG. 1A was approximated, not measured. Curves II–VI of FIG. 1B show similar results for optical transmission. For example, a dosage of $3\times10^{15}$ protons/cm.$^2$, followed by a subsequent anneal at 450° C. for 15 minutes, causes the proton-induced resistivity to decrease from about $2\times10^5$ ohm-cm. to about 7 ohm-cm. whereas the transmission increases from about 0.28 to nearly 1.0. The latter parameter indicates that nearly all the proton-induced absorption has been removed. Note that while lower dosages, such as $10^{14}$ protons/cm.$^2$, produce less proton-induced absorption, which can be more readily completely annealed out, such dosages also produce considerably less proton-induced resistivity, which is disadvantageously annealed out at useful annealing times and temperatures.

Where a higher final resistivity is desired after annealing, it is possible, for the same dosage (i.e., $3\times10^5$ protons/cm.$^2$), to anneal at a lower temperature and/or for a longer time. However, such anneals do not reduce the proton-induced absorption to a value as low as is desired for some applications. Alternatively, higher final resistivities may be attained by bombarding at a higher dosage. For instance, a dosage of $1\times10^{16}$ protons/cm.$^2$ produces an initial proton-induced resistivity of about $5\times10^4$ ohm-cm. and a transmission ratio of less than 0.1 which reflects an extremely high absorption coefficient (about 9000 cm.$^{-1}$). A subsequent anneal at 450° C. for 15 minutes decreases the resistivity to only $1.5\times10^3$ ohm-cm. and increases the transmission ratio to 0.8. Similarly, a single anneal at 500° C. for 5 minutes decreases the resistivity to about 50 ohm-cm. but increases the transmission ratio to about 0.9.

In order to maximize the efficiency of low threshold lasers, it is generally desirable to remove as much of the proton-induced optical absorption as possible, i.e., it is desirable to anneal at a time and temperature which increases the transmission ratio to as close to 1.0 as possible (FIG. 1B)—which indicates that the bulk-unbombarded absorption has been completely recovered. In practice we have found that sufficient post-anneal resistivity is retained, and nearly complete recovery of bulk absorption occurs, for dosages in the range of about $10^{15}$ to $10^{16}$ protons/cm.$^2$ and for anneals in the approximate ranges of 400° C. to 600° C. and 15 minutes to 1 minute. The following table gives more precise data within these ranges.

| Bombardment | Anneal | | Post-anneal | |
|---|---|---|---|---|
| Dosage (protons/cm.$^2$) | Temperature (° C.) | Time (min.) | Res. (ohms-cm.) | Trans. (ratio) |
| ~$1\times10^{15}$ | 400 | 15 | 5 | 1.0 |
| $2$–$3\times10^{15}$ | 450 | 15 | 2–9 | 1.0 |
| ~$4\times10^{15}$ | 500 | 5 | 2 | 1.0 |
| ~$1.8\times10^{16}$ | 600 | 1 | 2 | 0.95 |

Where, however, less than complete recovery can be tolerated wider ranges are permitted. For example, for 90% recovery the ranges are approximately $10^{15}$ to $3\times10^{16}$ protons/cm.$^2$, 30 minutes to 1 minute at 300° to 600° C.

Note that in FIG. 1A an anneal at 500° C. for five minutes following dosages in the range of about $2\times10^{16}$ to $4\times10^{16}$ protons/cm.$^2$ produces slightly higher resistivities than the pre-anneal, post-bombardment resistivity. The corresponding transmission ratio increases from about .02 to about 0.6. This feature will be described more fully hereinafter with respect to gallium phosphide which exhibits this characteristic in a more pronounced way.

Gallium Phosphide

In a similar fashion, wafers of n- and p-type crystals of GaP of orientation (111) were bombarded at room temperature with 300 kev. protons to doses ranging from $10^{12}$ to $2 \times 10^{17}$ protons/cm.$^2$. At doses above $10^{16}$ protons/cm.$^2$ the samples were thermally sinked to an ice bath (0° C.) to reduce heating of the samples during bombardment. In the range 100 to 300 kev. we have found from capacitance measurements that the proton damage extends to a depth about 0.8 $\mu$m. per 100 kev.

Figure 2A:
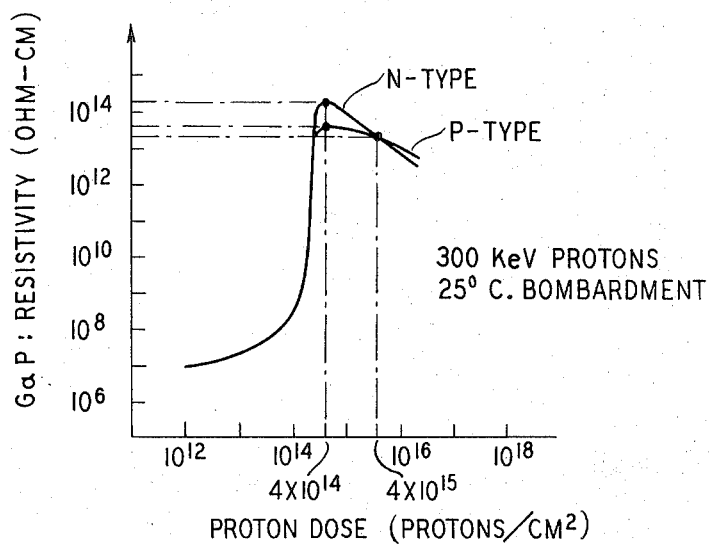
FIGS. 2A and 2B are graphs showing the effect of varying proton dosages on the resistivity and optical transmissivity, respectively, of GaP.

As shown in FIG. 2A, the proton-induced resistivity of n-type GaP samples increases monotonically with proton dose to a maximum of about $10^{14}$ ohm-cm. at a dosage of about $4 \times 10^{14}$ protons/cm.$^2$. At the same dosage, the p-type samples reached a slightly lower maximum resistivity of about $3 \times 10^{13}$ ohm-cm. For dosages greater than about $4 \times 10^{14}$ protons/cm.$^2$, the resistivity decreases monotonically for both n- and p-type samples. While we do not yet fully understand why the resistivity goes through a miximum as a function of proton dose, it is believed to be related to overcompensation of free carriers in the crystal by the proton beam.

Figure 2B:
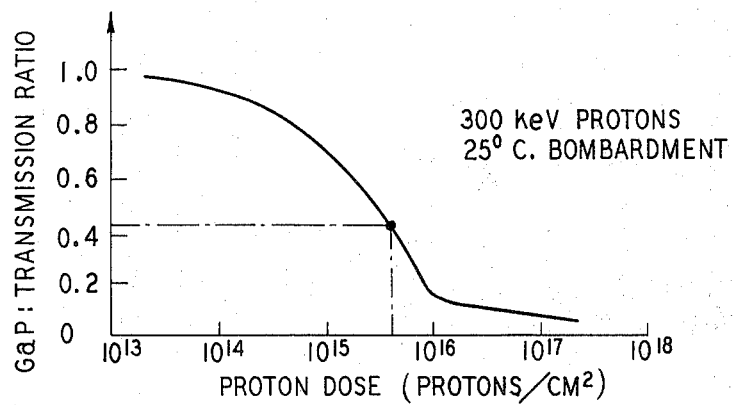

In contrast to the resistivity behavior, the proton-induced absorption of the bombarded samples increases with increasing dosage, but does not exhibit a maximum such as that in the resistivity curve of FIG. 2A. Absorption behavior can be seen in FIG. 2B which is a graph of transmission ratio versus proton dosage, where the ratio is the transmission through a bombarded sample divided by that through an unbombarded sample. The transmission ratio decreases monotonically with increasing dosage from a value of nearly 1.0 at $2 \times 10^{13}$ protons/cm.$^2$ to a value of about .05 to $2 \times 10^{17}$ protons/cm.$^2$.

Figure 2C:
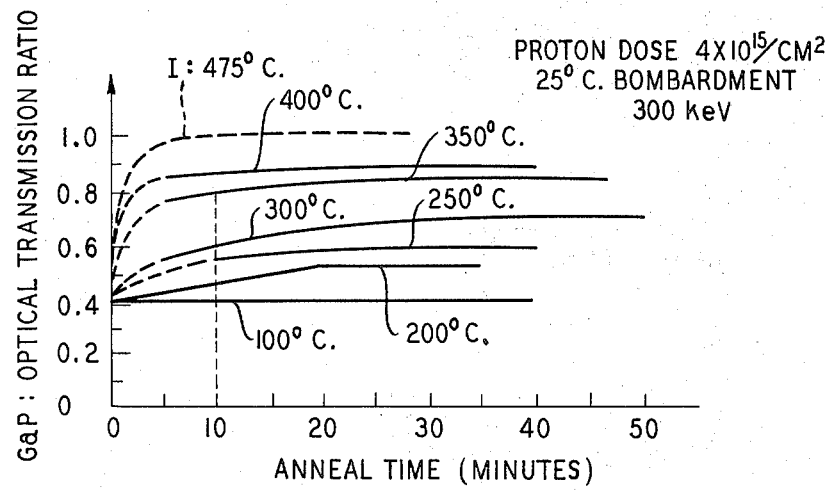
FIG. 2C is a graph showing the effect of annealing on the optical transmissivity of proton-bombarded GaP.

As with proton-bombarded GaAs, we have discovered that annealing proton-bombarded GaP substantially can reduce the proton-induced absorption to nearly the bulk-unbombarded value (about 2–4 cm.$^{-1}$ at about 6400 A.) while retaining the proton-induced resistivity at levels desirable for electrical insulation (e.g., at least about $10^5$ ohm-cm. for GaP LEDs). More specifically, FIG. 2C shows the isothermal annealing behavior of an n-type sample of GaP having a carrier concentration of about $3 \times 10^{17}$/cm.$^3$. The sample was bombarded at room temperature (about 25° C.) with 300 kev. protons to a dose of $4 \times 10^{15}$ protons/cm.$^2$. From FIG. 2C it is evident that following a 45 minute anneal at a temperature greater than or equal to 350° C., the transmission ratio recovers to more than 0.9, i.e., more than 90% of the optically absorbing defect centers have been removed. For all temperatures above 200° C., however, some increase in transmission was observed. This general annealing behavior characterized all proton doses in the range $10^{12}$ to $10^{17}$ protons/cm.$^2$.

Figure 2D:
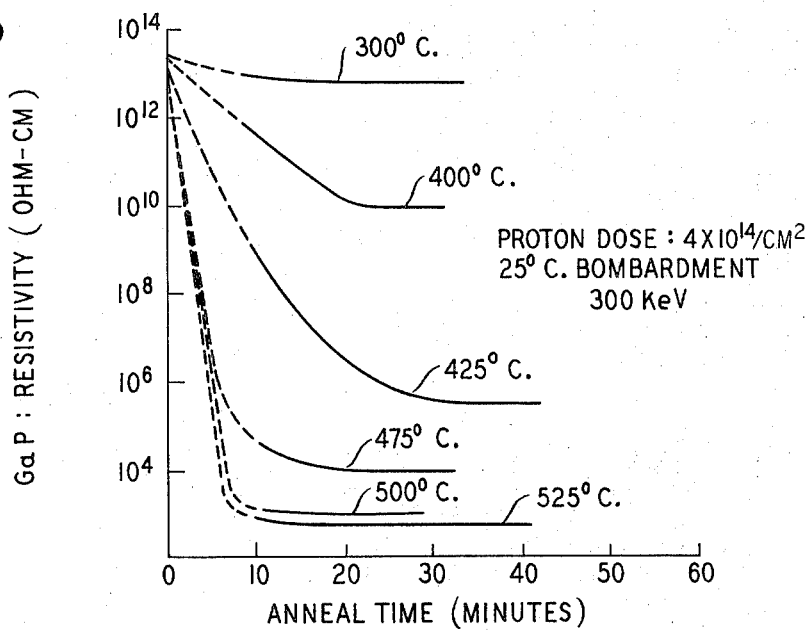
FIGS. 2D and 2E are graphs showing the effect of annealing on the resistivity of proton-bombarded GaP.
Figure 2E:
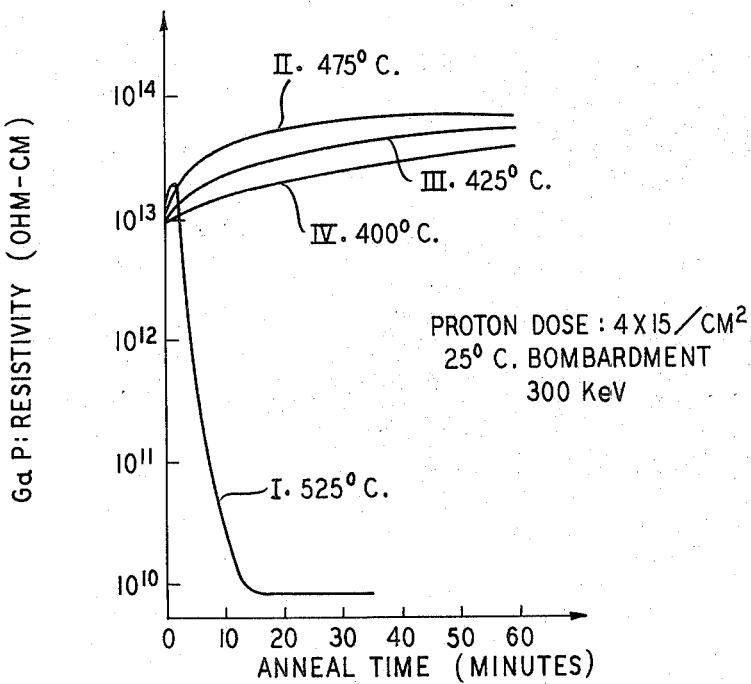

The annealing behavior of the proton-induced resistivity, however, was quite different. We found that for proton doses at or below that corresponding to peak resistivity, i.e., at or below $4 \times 10^{14}$ protons/cm.$^2$ (FIG. 2A), the proton-induced resistivity decreased monotonically with either increasing annealing time or increasing annealing temperature. This behavior is shown on the isothermal curves of FIG. 2D which correspond to a proton dose of $4 \times 10^{14}$ protons/cm.$^2$. In surprising contrast, however, for proton doses above the aforementioned peak, the resistivity first increased before eventually decreasing. This behavior is exhibited in FIG. 2E which shows isothermal resistivity curves versus annealing time for a proton dose of $4 \times 10^{15}$ protons/cm.$^2$. The time at which the resistivity begins to decrease, after having first increased, depends on the anneal temperature and is related to the activation energy of the proton-induced resistivity defects. Thus, after only about a three-minute anneal at 525° C. the resistivity begins to decrease abruptly (curve I, FIG. 2E) whereas after a sixty-minute anneal at 475° C. the resistivity curve II of FIG. 2E is still flat and shows no signs of decreasing. Note that in FIG. 2E the data of curves II–IV were measured from the same sample whereas the data of curve I was taken from a different sample and then multiplied by a fractor of $10^2$ to fit it onto FIG. 2E.

The foregoing property is put to useful advantage in accordance with one feature of our invention. That is, it is possible by appropriate annealing to reduce the proton-induced absorption while at the same time increasing the proton-induced resistivity. For example, assume a bombardment dosage of $4 \times 10^{15}$ protons/cm.$^2$ which produces an initial resistivity of about $10^{13}$ ohm-cm. (FIG. 2A). After annealing at 475° C. for only ten minutes, the resistivity increases to about $4 \times 10^{14}$ ohm-cm. (curve II, FIG. 2E) and the transmission ratio increases to more than .95 (curve I, FIG. 2C which has been approximated from data at lower temperatures).

Although the foregoing description relates specifically to GaAs and GaP, our technique is also useful with other materials such as AlGaAs, GaAlP and GaAsP. The use of our technique in the fabrication of GaAs-AlGaAs lasers is described hereinafter. In addition, we believe our technique will apply generally to semiconductor materials of the type which exhibit two types of defects as a result of proton bombardment, as was mentioned previously.

Device Fabrication

The foregoing proton bombardment technique is useful in the fabrication of numerous optical devices including, for example, beam-leaded electroluminescent diodes as described in a copending application of L. A. D'Asaro, M. Kuhn and S. M. Spitzer Ser. No. 203,978 filed concurrently herewith. The following discussion, however, will be specifically directed to the fabrication of semiconductor junction lasers.

Of particular interest is the form of junction lasers, termed the double heterostructure (DH), which has recently been made to operate continuously (C.W.) at room temperature as reported by I. Hayashi et al. in *Applied Physics Letters*, 17, 109 (August 1970). The DH laser is the subject matter of a copending application of I. Hayashi Ser. No. 33,705 filed on May 1, 1970 and assigned to the assignee hereof.

Figure 3A:
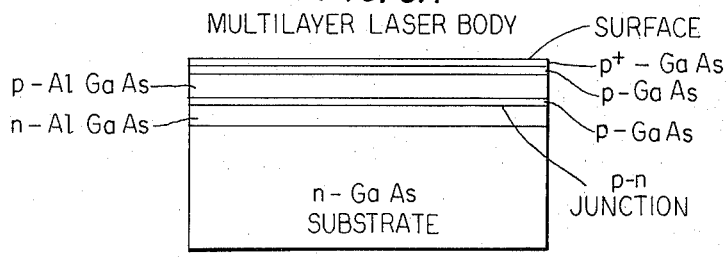
FIGS. 3A–3I are end views of a stripe geometry double heterostructure laser in various sequential stages of fabrication in accordance with one embodiment of our invention.

As shown in the wafer of FIG. 3A, before scribing and cleaving into individual diodes, the DH multilayer structure comprises, illustratively, an n-GaAs substrate upon which are grown successive epitaxial layers in the following order: a wide bandgap n-$Al_xGa_{1-x}As$ layer (about 5 $\mu$m. thick), a narrower bandgap p-GaAs active region layer (about 0.5 $\mu$m. thick) forming a p-n heterojunction therebetween, a wide bandgap p-$Al_yGa_{1-y}As$ layer (about 1.0 $\mu$m. thick) forming a p-p heterojunction with the GaAs layer, and an optional p-GaAs layer (about 1 $\mu$m. thick). To facilitate contacting, Zn impurities are diffused in the latter p-GaAs layer to a depth of about 0.2 $\mu$m. to form a $p^+$-GaAs layer therein. Typically, $x=y=0.3$ which produces an index of refraction step of about 0.1 at each heterojunction. Fabrication of the foregoing layers is illustratively performed by a liquid phase epitaxy technique as described by M. B. Panish et al. in *Metallurgical Transactions*, 2, 795 (March 1971).

For well known reasons of reduced thermal resistance and controlled transverse modes, it is desirable in some applications to fabricate such a laser with a stripe geometry electrical contact, i.e., an elongated contact which is coextensive with the diode along its length (e.g., about 200–400 $\mu$m.) but which is considerably narrower than the width of the diode (e.g., about 10–20 $\mu$m. wide compared to a diode width of 100–250 $\mu$m).

We describe hereinafter two illustrative applications of our invention for forming such stripe geometry contacts by proton bombardment. In the interest of clarity, the multiple layers of FIG. 3A (as well as FIG. 4A to be discussed later) are not shown in FIGS. 3B–3I. The p-n junction is shown, however, to provide a frame of reference.

Figure 3B:
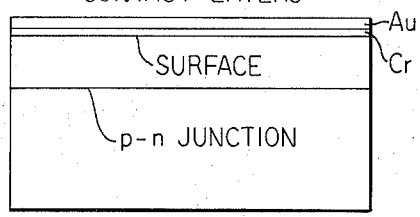
Figure 3C:
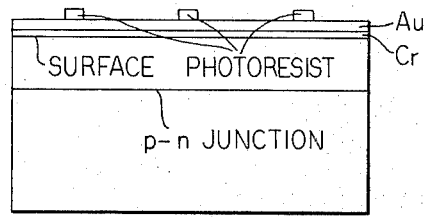
Figure 3D:
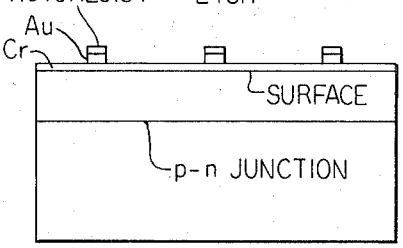
Figure 3E:
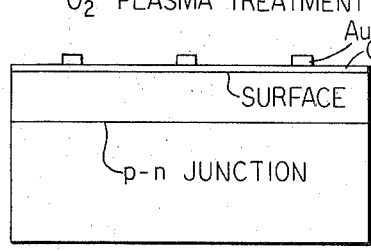

One application of our invention for forming stripe contacts on the laser body of FIG. 3A will be described with reference to FIGS. 3B–3I. First, as shown in FIG. 3B, the p+-GaAs uppermost surface of the double heterostructure wafer is covered with successive metallic layers—illustratively chromium (about 500 Angstroms) and then gold (about 3 $\mu$m. thick)— formed by any of several well known techniques such as evaporation or sputtering. The gold layer will subsequently be selectively etched to leave a plurality of gold stripes which will also serve to mask regions thereunder from protons made incident on the uppermost surface of the wafer. To this end, stripes of photoresist are formed on the gold layer (FIG. 3C) by well known photolithographic techniques. Only three such stripes are shown for simplicity, the actual number being determined by design and manufacturing considerations. Then the regions of the gold layer not under the photoresist are etched away by means of a solution of potassium iodide (FIG. 3D). While it is possible to etch the chromium layer in a similar manner, this step is not essential as long as the Cr layer is thin enough to permit proton penetration therethrough with little effect on the penetration depth of the protons into the semiconductor.

Before proton bombardment of the upper surface, we have found that it is advantageous that all of the remaining photoresist be removed from the gold layer (FIG. 3E) lest the protons cause the organic photoresist to polymerize into a hard substance which is extremely difficult to remove without damaging the wafer. Removal of such a polymer is dictated by the need to make electrical contact and, in some instances, to bond the laser to a heat sink. One procedure which is effective to remove completely the photoresist, therefore, is to treat the wafer in a commercially available oxygen plasma furnace.

The wafer is now ready for proton irradiation. An appropriate choice of proton energy and dosage is determined by a number of factors. First, regarding dosage: in order to confine adequately the current flow through a stripe geometry DH junction laser, and thereby produce high current densities in the active region layer, it is desirable that the inactive regions be highly resistive. These inactive regions extend laterally on either side of the active region underneath each contact and at least to the depth of the p-n junction. A resistivity of about 1.0 ohm-cm. has been found to be adequate. Moreover, although most of the optical field will be confined to the active region, the tails of the field, which are relatively large for narrow stripe widths (e.g. 5$\mu$m. stripes), extend into the inactive regions which, therefore, should have relatively low optical absorption in order to avoid unnecessarily increasing the lasing threshold. As discussed previously, the amount of proton-induced resistivity in GaAs and AlGaAs increases with increasing dosage until a maximum is reached at about $3 \times 10^{15}$ protons/cm.$^2$. Thereafter resistivity decreases with increasing dosage. Unfortunately, however, optical absorption also increases with increasing dosage. As discussed hereinafter, appropriate annealing substantially reduces the proton-induced absorption while retaining sufficient resistivity for current confinement purposes.

Secondly, regarding proton energy, it is noted that for adequate current confinement the high resistivity regions should extend from the top surface to approximately the depth of the p-n junction plane, and preferably slightly beyond. This distance is illustratively 2.0–2.5 $\mu$m. Consequently, the energy of the proton beam is illustratively 300 kev. since the proton penetration in GaAs is about 1 $\mu$m. for each 100 kev. In addition, for the stripe contacts to perform a masking function, the total thickness of each Cr-Au stripe contact (FIG. 3E) should be sufficient to prevent penetration of protons therethrough, e.g., in GaAs more than 3$\mu$m. for 300 kev. protons.

Figure 3F:
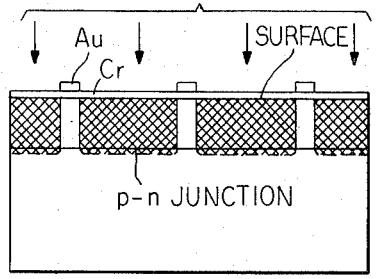
Figure 3G:
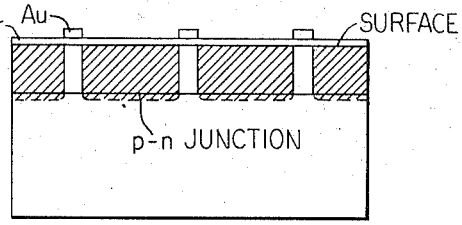

Illustratively, therefore, the top surface of the wafer, as shown in FIG. 3F, is typically irradiated with 300 kev. protons in a dosage of about $3 \times 10^{15}$ protons/cm.$^2$ which produces high resistivity in the cross-hatched inactive laser regions not masked by the stripe contacts. With such irradiation, the resistivity increases from the bulk value (about $6 \times 10^{-3}$ ohm-cm.) to about $2 \times 10^5$ ohm-cm. (FIG. 1A) while the absorption also increases from the bulk balue (about 54 cm.$^{-1}$) to about 5000 cm.$^{-1}$. The corresponding optical transmission drops to about 0.28 to the bulk (unbombarded) transmission as shown in FIG. 1B.

In order to reduce the proton-induced absorpiton while still retaining sufficient resistivity for current confinement (about 1.0 ohm-cm.), the bombarded wafer is preferably annealed (FIG. 3G) at 450° C. for 15 minutes, which we have found is nearly optimum for a proton dosage of $3 \times 10^{15}$ protons/cm.$^2$. The post-anneal resitivity remaining in the bombarded regions is about 9 ohm-cm. (FIG. 1A), more than adequate for current confinement, while the post-anneal absorption is nearly at the bulk value, i.e., the transmission ratio is nearly 1.0 as shown in FIG. 1B. The cross-hatched regions of FIG. 3F have been changed to shaded regions in FIGS. 3G–3I to indicate the removal of proton-induced absorption.

Note that if a higher resistivity is desired, it is a feature of our invention that a proton dosage of, say, $1 \times 10^{16}$ protons/cm.$^2$, higher than that which gives peak resistivity ($2 \times 10^5$ ohm-cm. in GaAs), could be used to give an initially lower, resistivity of, say, $5 \times 10^4$ ohm-cm. and an initially higher absorption than for lower dosages. Then, by annealing for example at 450° for 15 minutes the resistivity decreases to only $1.5 \times 10^3$ ohm-cm. (FIG. 1A), as contrasted with the 9.0 ohm-cm. post-anneal resistivity for a dosage of a $3 \times 10^{15}$ protons/cm.$^2$. However, this anneal removes only about 80% of the proton-induced absorption (FIG. 1B). To remove additional absorption, resistivity is sacrificed, e.g., an anneal at 500° C. for five minutes removes 90% of the proton-induced absorption and leaves about 40 ohm-cm. of resistivity in the bombarded regions.

Figure 3H:
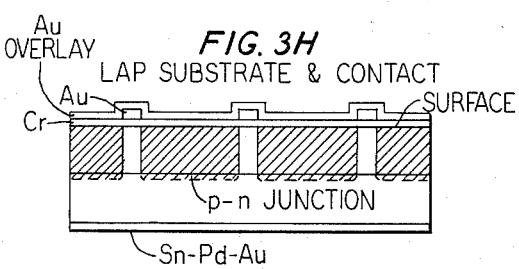
Figure 3I:
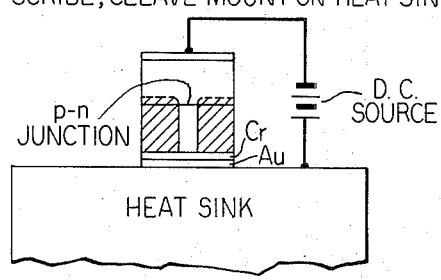

After annealing is completed, the substrate is lapped to a thickness of about 3–4 mils and a Sn-Pd-Au contact is evaporated, or otherwise formed, thereon as shown in FIG. 3H. In addition, a gold overlay is evaporated on the gold stripes. Alternatively, the gold stripes could first be removed and then a new gold layer evaporated on the chromium layer. In either case, however, the wafer is then scribed and cleaved into individual laser diodes. The upper (Cr-Au) contact of each diode is bonded to a heat sink (FIG. 3I), illustratively a copper block or a tin-plated Type II diamond as described by J. C. Dyment and L. A. D'asara in *Applied Physic Letters, 11,* 292 (1967). Note that the bumps formed by the Au stripes in FIG. 3H are removed upon bonding since the Sn plate of the heat sink forms a Sn-Au eutectic at the interface between the heat sink and the gold contact.

The lasser is now ready for operation by applying a forward bias D.C. source between the stripe contact and the heat sink. Double heterostructure lasers so fabricated have operated C.W. at a wavelength of about 0.9 $\mu$m. at room temperature and above with current thresholds 30–100% below those of similar lasers in which oxide layers were used to define the stripe. For example, the current threshold in two DH lasers, each of length 400 $\mu$m. and of stripe width 12 $\mu$m., was about 200 ma. for the proton bombarded laser and 400 ma. for the corresponding oxide-layer laser.

Figure 4A:
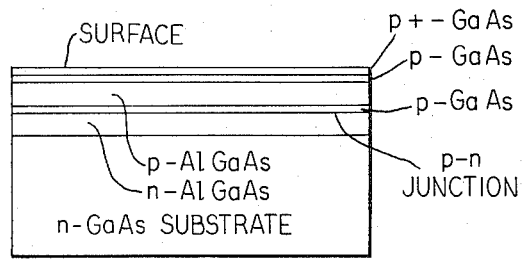
FIGS. 4A–4H are end views of a stripe geometry double heterostructure laser in various sequential stages of fabrication in accordance with another embodiment of our invention.
Figure 4B:
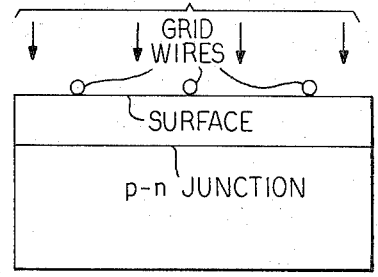

A second application of our invention is illustrated in FIGS. 4B–4H in which an alternative and simpler form of proton-masking is utilized to define stripe contacts on a DH laser shown in FIG. 4A (which is identical to FIG. 3A). More specifically, before any contact layers are formed on the uppermost surface, a grid of spaced parallel wires (FIG. 4B) is positioned in contact with the uppermost surface. The wires, which are mounted in a frame (not shown) are illustratively about 0.5 mil in diameter and spaced about 10 mils apart. The precise dimensions depend on laser design considerations, e.g., the desired stripe contact width. A jig or other positioning assembly (not shown) is used to position the wires normal to cleavage faces or mirrors of the laser (i.e., normal to the plane of the paper). These wires serve to define a plurality of stripe regions, about 12 $\mu$m. wide, which are masked from proton irradiation as shown in FIG. 4B.

Figure 4C:
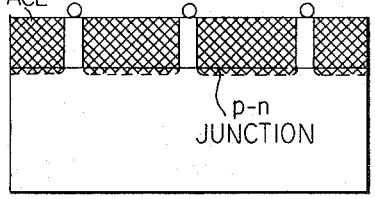
Figure 4D:
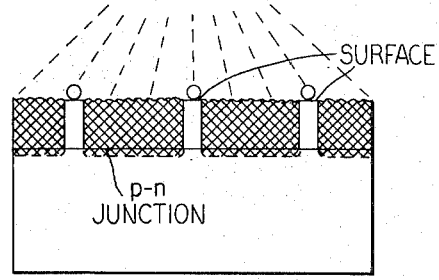
Figure 4E:
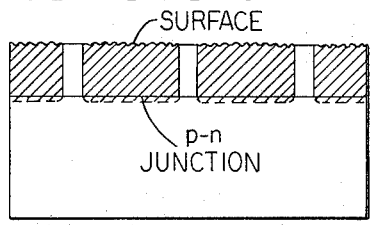

As before, proton irradiation, illustratively at 300 kev. and $3 \times 10^{15}$ protons/cm.$^2$ produces high resistivity and high absorption in the cross-hatched regions as shown in FIG. 4C. In order to be able to visibly "see" the stripes, a well known liquid honing procedure follows in which, illustratively, 5 $\mu$m., particles suspended in water are sprayed onto the wafer in order to roughen the bombarded surfaces as shown in FIG. 4D. Next, the wire grid is removed and the wafer is annealed, as before, at about 450° C. for 15 minutes to reduce the proton-induced optical absorption (FIG. 4E) to substantially the bulk (unbombarded) value. Considerations, previously discussed, regarding the proton energy and dosage and the annealing parameters apply equally as well to this embodiment.

Figure 4F:
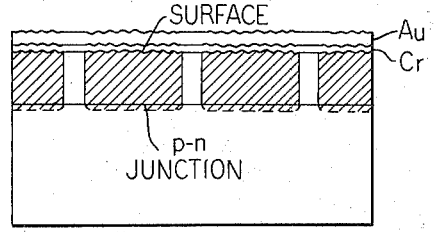
Figure 4G:
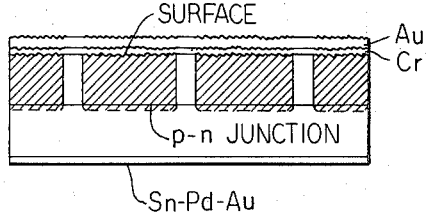
Figure 4H:
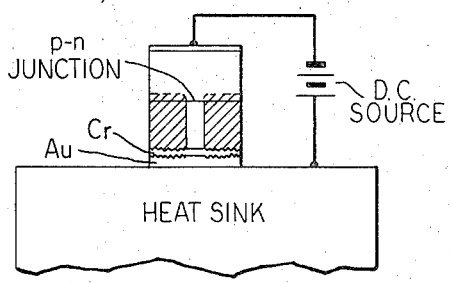

After annealing, metalic contact layers are formed on the entire uppermost surface, e.g., a layer of chromium 500 Angstroms thick and then a layer of gold 8000 Angstroms thick (FIG. 4F). Note that thinner contact layers can be used in this embodiment since the contacts are not used to mask protons. Next, the substrate is lapped to a thickness of 3–4 mils and a metallic contact, e.g., Sn-Pd-Au, is applied thereto in a conventional way (FIG. 4G). Finally, the wafer is scribed and cleaved into individual laser diodes which are bonded to a metallic or metallized heat sink as shown in FIG. 4H. As with the previous embodiment, the upper contact (Cr-Au) is bonded to the heat sink, and, once again, where the heat sink is Sn-plated diamond, a Sn-Au eutectic is formed at the interface between the Au contact and the heat sink. Alternatively, to further facilitate heat removal, both the upper and lower contacts may be bonded to heat sinks.

Figure 5:
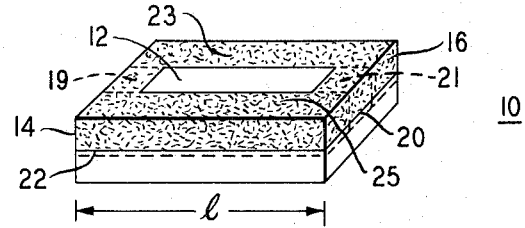
FIG. 5 is a pictorial view of a stripe geometry junction laser passivated in accordance with one more embodiment of our invention.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, our invention may be used to passivate p-n junctions, such as the stripe geometry junction laser 10 shown in FIG. 5. The numeral 12 designates an elongated stripe contact region formed either by the etching technique of FIG. 3D or by using the wire grid masking echnique of FIG. 4B twice, i.e., once along the width dimension and once along the length of dimension. In this case however, the stripe 12 is not coextensive with the length *l* between the mirror surfaces 14 and 16 of the laser 10. Consequently, end regions 19 and 21 in addition to lateral regions 23 and 25, can be irradiated with protons to produce high resistivity (and high optical absorption, as before) in the stipled regions to at least the depth of junction 22. Passivation results at the junction in the region 20 which is exposed to the external atmosphere at mirror surface 16 and which is substantially coextensive with the width of stripe 12. (The corresponding region of the junction 22 in mirror surface 18 is not shown). Subsequent annealing, as previously described, reduces the proton-induced optical absorption while maintaining sufficient resistivity in region 20 for passivation (and in regions 23 and 25 for current confinement). Moreover, proton bombardment as described herein not only produces increased resistivity and optical absorption in the bombarded region but also inherently produces small increases in the refractive index. With a suitable post-anneal the latter inherent property may be useful in the fabrication of optical waveguides.

What we claim is:

1. A method of fabricating at least one electrically insulative region in a semiconductor body of a Group III(a)–V(a) compound comprising the steps of
   irradiating said region with high energy protons, said irradiation advantageously producing in said region high resistivity and disadvantageously also producing in said region high optical absorption, relative respectively to the bulk resistivity and bulk absorption of said region prior to irradiation, and characterized in that
   said body is irradiated with protons to a dose in the range of approximately $10^{14}$ to $10^{17}$ protons/cm.$^2$, and
   said body is annealed for a time in the range of approximately 1 hour to 1 minute at a temperature in the range of approximately 300° C. to 600° C. effective to reduce said high optical absorption in said region substantially to said bulk absorption while maintaining said resistivity at a level sufficient for electrical insulation.

2. The method of claim 1 wherein said material is selected from the group consisting of GaAs and GaAlAs, and said region is irradiated with protons to a dose in the range of approximately $1 \times 10^{15}$ to $3 \times 10^{16}$ protons/cm.$^2$ and said body is annealed for a time in the range of approximately 30 minutes to 1 minute at a temperature in the range of approximately 300° C. to 600° C.

3. The method of claim 2 wherein said ranges are approximately $1 \times 10^{15}$ to $1 \times 10^{16}$ protons/cm.$^2$, 15 minutes to 1 minute and 400° C. to 600° C.

4. The method of claim 3 wherein said dose is approximately $3 \times 10^{15}$ protons/cm.$^2$ and annealing is done at about 450° C. for about 15 minutes.

5. The method of claim 1 wherein said material is selected from the group consisting of GaP, GaAsP and GaAlP, said region is irradiated with protons in the range of approproximately $10^{14}$ to $10^{17}$ protons/cm.$^2$ and said body is annealed for a time in the range of approximately 1 hour to 5 minutes at a temperature in the range of approximately 300° C. to 600° C.

6. The method of claim 1 wherein said region is characterized by the property that the proton-induced resistivity increases with increasing proton dosage until a peak resistivity is attained and thereafter decreases, said irradiation is of a dosage greater than the corresponding to said peak resistivity, and said annealing causes the resistivity of said region to increase toward said peak resistivity and causes the absorption of said region to decrease toward said bulk absorption.

7. The method of claim 6 wherein said semiconductor body comprises GaP and said dosage is greater than approximately $4 \times 10^{14}$ protons/cm.$^2$.

8. The method of claim 7 wherein said annealing is done within the approximate ranges of 60 to 5 minutes at 400 to 525° C.

9. The method of claim 6 wherein said semiconductor body comprises GaAs and said dosage is greater than approximately $3 \times 10^{15}$ protons/cm.$^2$.

10. The method of claim 9 wherein said dosage is about $3 \times 10^{16}$ proton/cm.$^2$ and said annealing is done at approximately 500° C. for 15 minutes.

11. The method of claim 1 wherein said semiconductor body includes a planar p-n junction therein separated from the surface of said body being irradiated and said protons are of sufficient energy to penetrate to at least the depth of said junction.

12. A proton bombardment method of fabricating a stripe geometry p-n junction laser from a semiconductor body of a Group III(a)–V(a) compound including a planar p-n junction comprising the steps of
  (A) shielding at least one elongated stripe region on a first major surface of said body to prevent any substantial number of protons from being incident on said stripe region, and thereby defining intermediate regions on either side of each of said stripe regions,
  (B) irradiating said first major surface with high energy protons to a dose in the range of approximately $10^{14}$ to $10^{17}$ protons/cm.$^2$ and with sufficient energy to cause said protons incident on said intermediate regions to penetrate to approximately the depth of said p-n junction, said protons advantageously producing high resistivity in said intermediate regions and disadvantageously also producing high optical absorption therein, relative respectively to the bulk resistivity and bulk absorption of said intermediate regions prior to irradiation, and
  (C) annealing said body for a time in the range of approximately 1 hour to 1 minute at a temperature in the range of approximately 300° C. to 600° C. effective to reduce said high optical absorption in said intermediate regions substantially to said bulk absorption while maintaining said resistivity at a level sufficient for electrical insulation, whereby when said p-n junction is forward-biased the flow of electrical current between said first major surface and said junction is substantially confined to the region beneath said stripe region.

13. The method of claim 12 wherein said shielding step (A) comprises the steps of
  (A1) forming at least one metallic layer on substantially said entire first major surface, and
  (A2) removing portions of said metallic layer to define at least one stripe metallic layer covering said elongated stripe region, said stripe metallic layer being of sufficient thickness to prevent the penetration of protons therethrough.

14. The method of claim 13 wherein said removing step (A2) includes the steps of
  (A2a) forming at least one layer of photoresist on said metallic layer over each of said elongated stripe regions,
  (A2b) etching away those regions of said metallic layer not covered by photoresist, thereby defining at least one stripe metallic layer, and
  (A2c) prior to irradiating step (C) removing said photoresist from said stripe metallic layers.

15. The method of claim 13 wherein said removing step (A2c) comprises subjecting said photoresist to an oxygen plasma.

16. The method of claim 15 including the steps of
  (D) forming a second metallic contact layer on a second major surface of said body, and
  (E) mounting said body on at least one heat sink.

17. The method of claim 16 wherein said mounting step (E) includes the step of bonding at least said stripe metallic layer to a heat sink.

18. The method of claim 15 wherein said semiconductor body comprises a multilayered structure in which each layer comprises a compound which includes at least Ga and As.

19. The method of claim 18 wherein said laser comprises a double heterostructure junction laser.

20. The method of claim 18 wherein said irradiating occurs to a dose in the range of approximately $1 \times 10^{15}$ to $3 \times 10^{16}$ protons/cm.$^2$ and said annealing is done for a time and at a temperature in the ranges of approximately 30 minutes to 1 minute and 300° C. to 600° C.

21. The method of claim 20 wherein said ranges are approximately $1 \times 10^{15}$ to $1 \times 10^{16}$ protons/cm.$^2$, 15 minutes to 1 minute and 400° C. to 600° C.

22. The method of claim 21 wherein said dose is approximately $3 \times 10^{15}$ protons/cm.$^2$ and annealing is done at about 450° C. for about 15 minutes.

23. The method of claim 12 wherein said shielding step (A) comprises the step of positioning a grid of spaced parallel wires over said first major surface, thereby defining said elongated stripe reigons as those regions beneath each wire and further defining said intermediate regions as those regions between said wires, said wires being of sufficient diameter to prevent any substantial number of protons from penetrating therethrough.

24. The method of claim 23 including between said irradiating step (B) and said annealing step (C) the additional step of roughening the surface of said intermediate regions to render same distinguishable to the naked eye from said stripe regions.

25. The method of claim 24 wherein said roughening step includes the step of liquid honing said intermediate regions while said grid is still positioned over said first major surface.

26. The method of claim 23 including the step of removing said grid prior to said annealing step (C).

27. The method of claim 26 including after said annealing step (C) the additional steps of
  (D) forming at least one metallic contact layer on said first major surface,
  (E) forming at least one metallic contact layer on a second major surface of said body opposite to said first surface, and
  (F) cleaving said body between said stripe regions to form a plurality of p-n junction laser diodes.

28. The method of claim 27 including the additional step of mounting at least one of said diodes on at least one heat sink.

29. The method of claim 23 wherein said semiconductor body comprises a multilayered structure in which each layer comprises a compound which includes at least Ga and As.

30. The method of claim 29 wherein said laser comprises a double heterostructure junction laser.

31. The method of claim 30 wherein said irradiating occurs to a dose in the range of approximately $1 \times 10^{15}$ to $3 \times 10^{16}$ protons/cm.$^2$ and said annealing is done for a time and at a temperature in the ranges of approximately 30 minutes to 1 minute and 300° C. to 600° C.

32. The method of claim 31 wherein said ranges are approximately $1 \times 10^{15}$ to $1 \times 10^{16}$ protons/cm.$^2$, 15 minutes to 1 minute and 400° C. to 600° C.

33. The method of claim 32 wherein said dose is approximately $3 \times 10^{15}$ protons/cm.$^2$ and said annealing is done at about 450° C. for about 15 minutes.

References Cited

UNITED STATES PATENTS

| | | | |
|---|---|---|---|
| 3,457,632 | 6/1969 | Dolan, Jr. et al. | 29—578 |
| 3,515,956 | 6/1970 | Martin et al. | 317—234 |
| 3,586,542 | 6/1971 | MacRae | 148—1.5 |
| 3,622,382 | 11/1971 | Brack et al. | 117—201 |
| 3,663,308 | 5/1972 | Davey | 148—1.5 |
| 3,666,548 | 5/1972 | Brack et al. | 117—212 |
| 3,707,765 | 1/1973 | Coleman | 29—578 |

OTHER REFERENCES

Foyt et al.: "Isolation of Junction Devices in Ga As Using Proton Bombardment," Solid State Electronics, 12, pp. 209–214, 1969.

HYLAND BIZOT, Primary Examiner

J. M. DAVIS, Assistant Examiner

U.S. Cl. X.R.

29—589; 317—235

UNITED STATES PATENT OFFICE
CERTIFICATE OF CORRECTION

Patent No. 3,824,133                    Dated July 16, 1974

Inventor(s) L. A. D'Asaro, J. C. Dyment, M. Kuhn, S. M. Spitzer

It is certified that error appears in the above-identified patent and that said Letters Patent are hereby corrected as shown below:

Column 1, line 59, change "is" to --in-- where it occurs between "bond" and "lasers".

Column 4, line 22, change "3 x $10^5$" to --3 x $10^{15}$--.

Column 5, line 20, change "miximum" to --maximum--.

Column 6, line 4, change "fractor" to --factor--.

Column 7, line 70, after "penetration" change "is" to --in--.

Column 8, line 3, change "water" to --wafer--;

line 11, after "bulk" change "balue" to --value--;

line 15, change "absorpiton" to --absorption--;

line 55, change "D'asara" to --D'Asaro--;

line 60, change "lasser" to --laser--.

Column 9, line 30, change "metalic" to --metallic--;

line 60, change "echnique" to --technique--;

line 61, after "length" delete "of".

Column 10, line 45, change "approproximately" to --approximately--.

Signed and sealed this 15th day of October 1974.

(SEAL)
Attest:

McCOY M. GIBSON JR.                    C. MARSHALL DANN
Attesting Officer                       Commissioner of Patents